Jan. 20, 1970   R. E. VOISIN   3,490,178
METAL FRAMING
Filed June 23, 1967   3 Sheets-Sheet 1
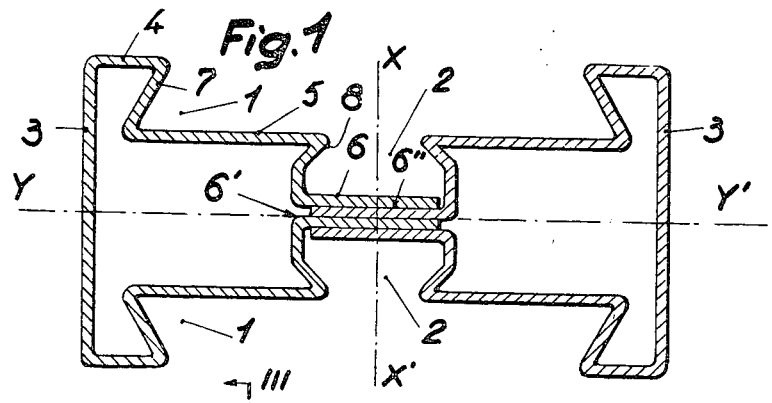
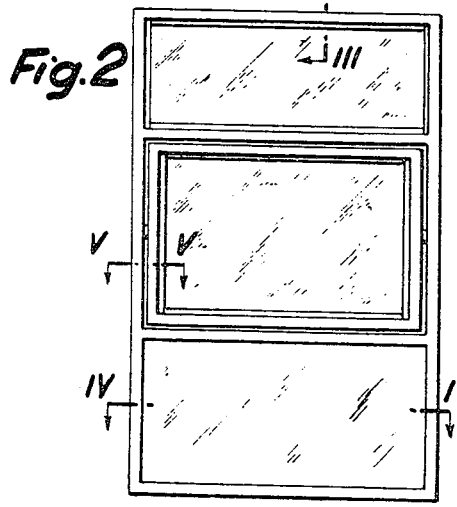
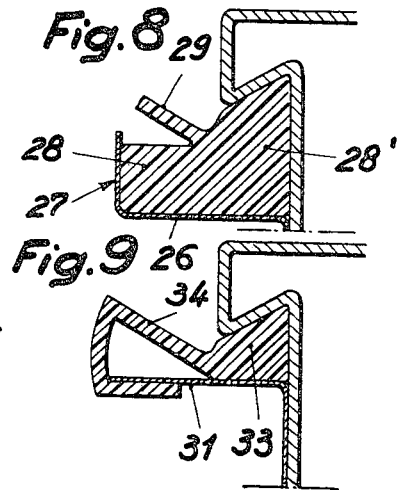
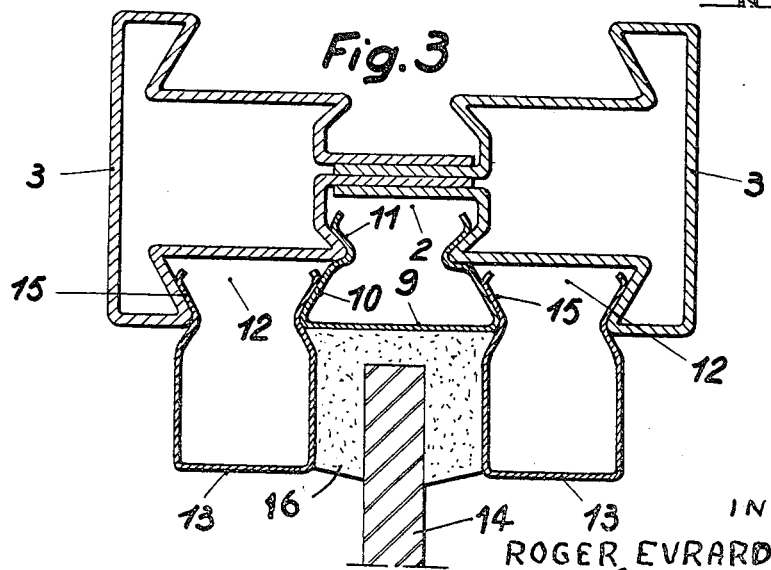
INVENTOR
ROGER EVRARD VOISIN
By Linton and Linton
ATTORNEYS

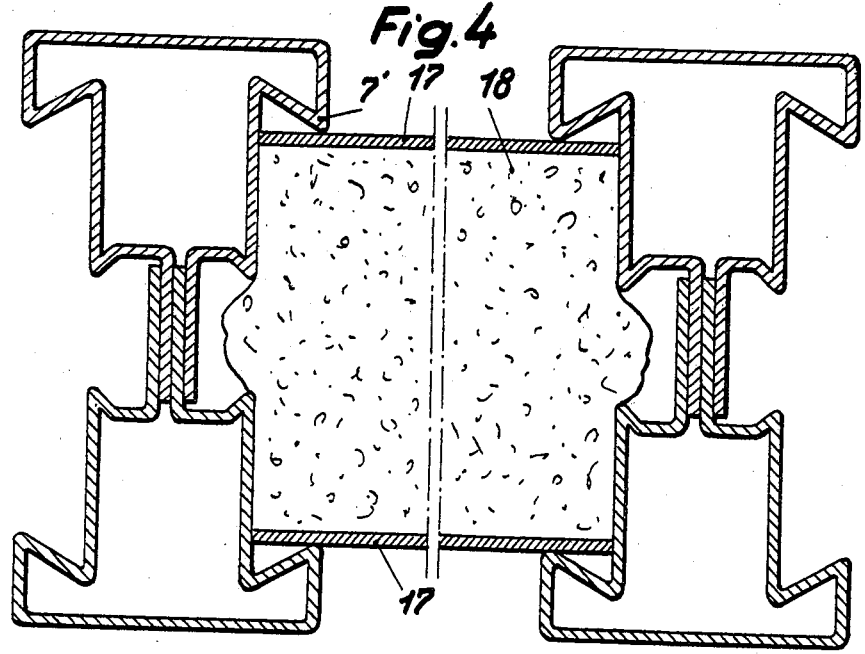
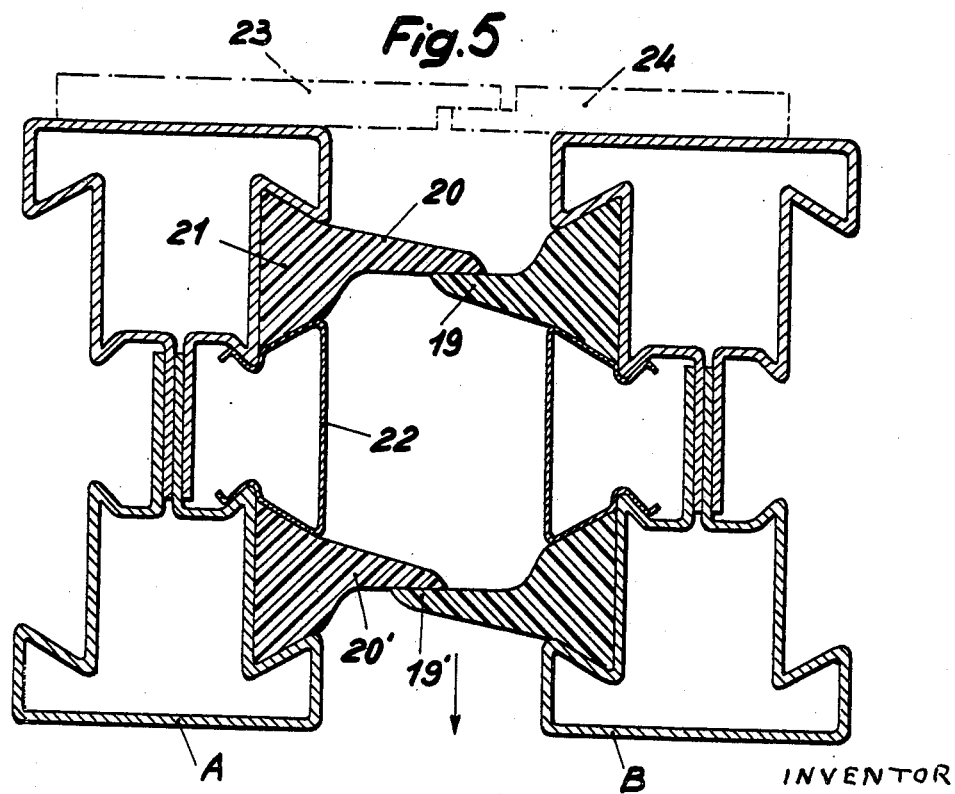

Jan. 20, 1970    R. E. VOISIN    3,490,178
METAL FRAMING

Filed June 23, 1967    3 Sheets-Sheet 3

INVENTOR
ROGER EVRARD VOISIN
By Linton and Linton
ATTORNEYS

United States Patent Office 3,490,178
Patented Jan. 20, 1970

3,490,178
METAL FRAMING
Roger Evrard Voisin, 47 Rue Raspail, Bois-Colombes, Hauts-de-Seine, France
Filed June 23, 1967, Ser. No. 648,429
Claims priority, application France, Jan. 20, 1967, 91,918
Int. Cl. E06b 3/04
U.S. Cl. 49—489                                                5 Claims

ABSTRACT OF THE DISCLOSURE

A hollow channel framed from two identical U-shaped joined elements which provide a frame having opposite faces wherein in each of said faces there are two longitudinal grooves each in the form of a dovetail and with one groove opening on one face of the frame and the second groove opening on the bottom of the first groove. The channel is intended particularly, but not exclusively for the construction of all types of metal framing such as, for example, the frame of doors, windows or bays as well as the frames necessary to support movable panels, whether of glass or not, which extend over them and also the manufacture thereof.

BRIEF SUMMARY OF THE INVENTION

The present frame is formed from two identical joined elements which provide a frame having opposite faces in each of which there are two longitudinal grooves each in the form of a dovetail and with one groove opening on one face of the frame and the second groove opening on the bottom of the first groove. It is an object of the invention to provide such a frame to support panels therein and also to attach pivots of linkages, sealing components and the like and also to receive strips, moldings, rubber sheets, blades, channels, or flexible joints for providing various types of framing for doors, windows, bays and the like as well as fixed or moveable panels.

DESCRIPTION

The present channel which is rectangular in section, has, on each of its two opposite faces, two longitudinal dovetailed grooves with the first groove opening in one face of the channel while the second, which is narrower, opens in the bottom of the first groove.

Said grooves are arranged so as to allow the channel to receive two perpendicular planes of symmetry.

The present channel is assembled from two identical profiled elements, for example of stainless steel, obtained from a thin metal band, so as to obtain a final profiled piece having two perpendicular planes of symmetry.

Each said element has a U-shaped section, each of whose lateral legs has three rectilinear parts, perpendicular to a median part thereof, united together by two oblique parts, so that said lateral legs narrow down at their extremities, and the interior face of one of said extremities is in the median plane of the element while that of the interior face is separated from the first by a distance equal to the thickness of the material to be used therebetween.

During the assembly of the two identical elements, the extremities of their lateral legs are engaged one upon the other so that the extremity of each element has its interior face arranged in said median plane, then the branches thus assembled are fastened by any usual means, for example by electric welding.

In this fashion the channel of the invention has a reinforced median part corresponding to the bottoms of small dove-tail grooves henceforth called interior grooves, and which may be used to attach pivots of linkages, sealing components, and the like.

With this type of channel one may solve all framing problems occurring in metal work, as will be explained below by means of some examples.

To hold a fixed or movable pane in a frame made with the channel of the present invention, the interior groove is closed off by a strip having an exterior dove-tail section and splitting the exterior groove into two grooves used to hold moldings arranged on either side of said pane.

The strip and the moldings are engaged resiliently in their respective grooves and, as such, they assume a section substantially in the form of a U whose lateral branches widen near their extremities and said flaring parts bear resiliently against the oblique sides of the corresponding grooves by opposing their contraction.

The channel of the present invention may also be used with solid panels, these being composed of two thin sheets whose sides extend to the bottom of the exterior grooves with said sheets being separated resiliently from each other in order that their exterior face bears against the projecting edges of said grooves.

The seal between a fixed frame and a pivoting movable frame is provided by two sealing joints arranged along each of the faces opposite said frames, each having a trapezoidal section fixing sole held in dove-tail grooves constituted by the oblique side of the exterior groove of the channel and one of the sides of the median strip mounted on the interior groove, as previously described.

Other characteristics will appear better from the following description of the attached drawings in which;

FIG. 1 is a view in transversal section of the channel of the present invention.

FIG. 2 is a front view, on a smaller scale, of a bay consisting of three parts, to wit: an upper part provided with a glassed fixed frame, a median part having an open glassed frame, and a lower part closed off by a panel.

FIG. 3 is a partial view in section taken on line III—III of FIG. 2.

FIG. 4 is a sectional view taken on line IV—IV of FIG. 2.

FIG. 5 is a sectional view taken on line V—V of FIG. 2.

FIG. 8 is a partial sectional view showing the position of one of the two sealing joints of FIG. 6 when the window is open.

FIG. 9 is a partial sectional view showing the position of one of the two sealing joints of FIG. 7 when the window is open.

Figure 6:
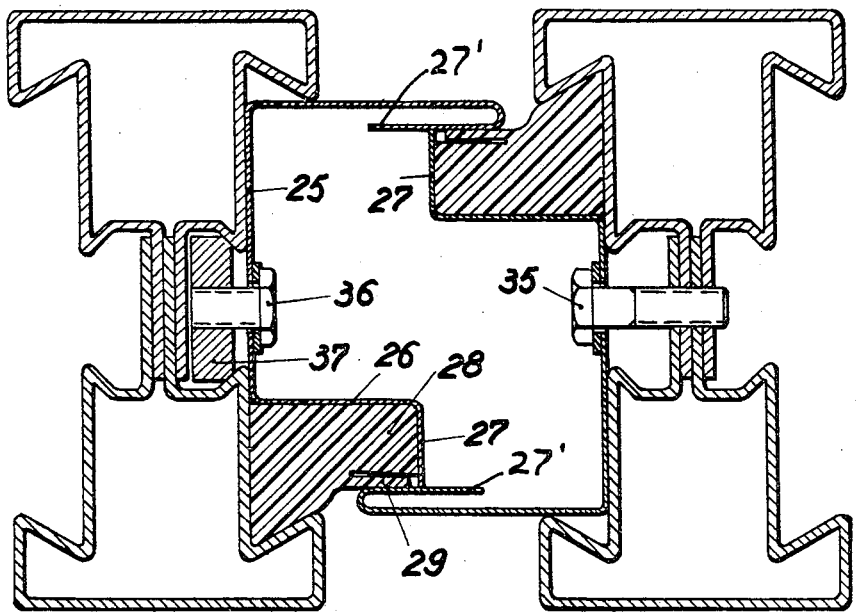
FIG. 6 is a view similar to FIG. 5 showing a modified structure for providing the sealing between the fixed frame and the movable frame.

Referring now more particularly to the accompanying drawings, and particularly FIG. 1, it can be seen that the channel has a rectangular section and has on each of two of its opposite faces two longitudinal dovetail grooves 1 and 2, each exterior groove 1 opening on one of the faces of the channel while the interior groove 2 opens in the bottom of said groove 1.

The grooves 1 and 2 are arranged so that the channel has two perpendicular planes of symmetry, whose traces on FIG. 1 appear at x–x' and y–y'.

The manufacturing process for this channel consists in assembling two identical elements obtained from a metallic band, of stainless steel for example, so as to obtain a final channel having two mutually perpendicular planes of symmetry, each of said planes of symmetry being parallel to two of the opposite faces of said final channel.

Each of the foregoing elements has a U-shaped section, with a median base part 3 and lateral legs each having three rectilinear parts 4, 5, and 6 perpendicular to said median part 3 and joined by oblique parts 7 and 8 so that said lateral legs narrow down at their extremities 6.

The interior face 6' of one of the extremities of the lateral legs is situated in the median longitudinal plane x–x' of the element while the other face 6" is separated from it by a distance substantially equal to the thickness of the stock to be used therebetween.

To assemble the two elements, the extremities 6 of one are inserted between those of the other element in such a manner that each of said extremities is on either side of the median plane of the other element and that one extremity of each element has its interior face oriented in the plane y–y'.

The two elements are held together by electric welding.

FIG. 3 illustrates a glass frame provided by means of the channel of the present invention and, to this end, the groove 2 is closed off by a strip 9 partially extending in said groove. Said strip 9 has a trapezoidal section with a small open base whose oblique sides 10 have extensions 11 flaring towards the outside, and which can be engaged resiliently in groove 2 by bearing against its oblique dovetail parts 8. The oblique sides 10 of the strip 9 form, with those 7 of the groove 1, two small grooves 12 used to attach moldings 13 and retaining the pane 14, by the possible interposition of an appropriate putty 16. To this end, each molding 13 has a U-shape section whose extremities 15 of the lateral branches thereof are formed to engage resiliently in the grooves 12 and to be retained therein.

The mounting of the pane is carried out as follows:

The strip 9 and one of the moldings 13 are set by engaging them resiliently by pressure thereon into their respective groove, then the glass 14 is placed, with interposition of a usual caulking 16 and then, finally, the second molding is set in place.

The setting of the glass can be done very quickly for it does not require any special machining of the channel or of the moldings, nor the use of screws or a welding operation and it is also easily done and does not require the use of skilled personnel.

When the metallic frame must pivot around axes, whether horizontal or vertical, one may advantageously use the solid median part of the channel forming the opening frame to attach the pivots and the bearings therefore can be attached to the solid median part of the fixed frame, or vice versa.

The channel of the present invention also lends itself very well to the forming of solid panels, whether fixed or movable.

Referring to FIG. 4, it can be seen that the solid panel is composed of two sheets 17 whose sides extend to the bottom of grooves 1 of the channel with said sheets being held apart from each other and applied against the projecting edges 7' of said grooves. This spacing of sheets 17 may be achieved by means of a sheet 18 of foam rubber or the like, arranged between the two sheets 17 and whose thickness is greater than the opening of the grooves 1, or by any appropriate filling, or yet by means of springs (not represented).

FIG. 5 is a view in section illustrating a first method of providing a sealing device between a fixed frame A and a movable or opening frame B. The sealing is provided when the movable frame B is closed by a blade 19 made of a soft material such as "Neoprene," bearing against a similar blade 20 mounted on the fixed frame A. To improve the sealing, a second pair of blades 19' and 20' similar to blades 19 and 20 are used with said blades 19 and 20' having a different degree of hardness than blades 20 and 19'.

Said blades each have a fixing sole 21 with a trapezoidal section, and they are held in their corresponding groove 1 by an extruded strip 22, identical to 9, and engaging resiliently in groove 2. The pivoting of the frame B may be limited by means of mechanical stops constituted by extensions 23 and 24, mounted respectively on the fixed and the movable parts of the frame.

According to another modified form for obtaining a mechanical stop during the closing of the movable frame, see FIG. 6, one may use a U-shaped channel with unequal legs, attached by its median part 25 to the bottom of the corresponding groove 1, and of which one of the lateral legs 26 is bent towards the outside at 27.

A joint 28, made of a flexible material, is held at one point between the bottom of groove 1 and the bent extremity of leg 26, and at another point between said leg and one of the oblique sides of said groove. In addition joint 28 has a longitudinal tongue 29 situated obliquely with reference to its sole 28' and extending towards the outside, see FIG. 8.

Each of the elements of frames A and B (FIGURE 5) has a U-shaped channel and an identical joint 28 arranged so that the linear leg 27' of the channel is mounted on the movable frame to abut when closed against the bent extremity 27 of the channel of the fixed frame, depressing the tongue 29 of the corresponding joint, while the bent extremity 27 of its other leg bears against the rectilinear leg 27' of said channel mounted on the fixed frame.

Figure 7:
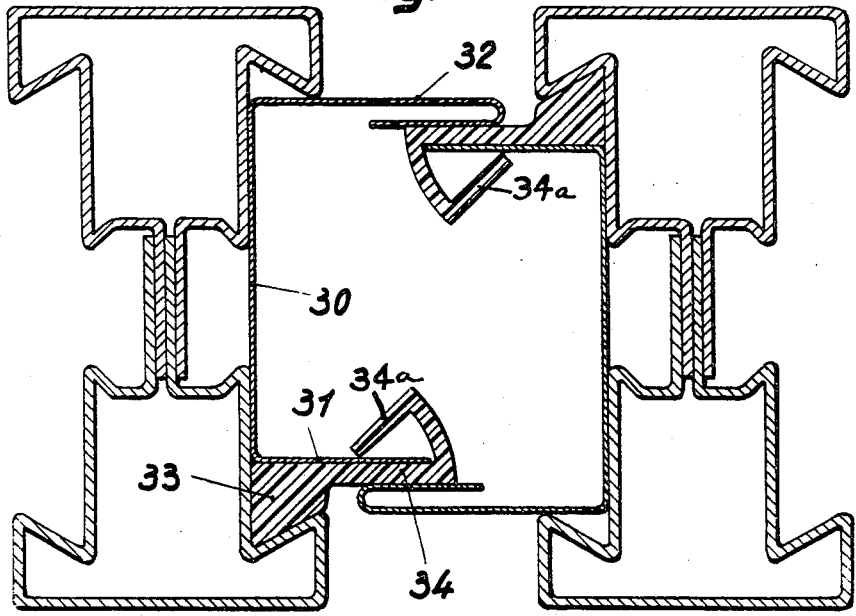
FIG. 7 is a sectional view of a modification of FIG. 6.

According to a further modification, see FIGS. 7 and 9, to provide these joints, a U-shaped channel is attached by its median part 30 to the bottom of the groove 1 of the corresponding fixed and the movable frames. Said channel has two unequal legs 31 and 32. The sealing of this modified form of the invention is provided by a joint whose sole 33 is held against the oblique side of groove 1 and a leg 31, and extends at 34 obliquely towards the outside with respect to the bearing face of said sole and bends at 34a back over the extremity of said leg 31. The fixed and movable channels holding the joints, as well as the joints themselves, are arranged so as to face one another. When the movable frame B is closed, the tongues 34 of the joints are compressed between the legs 31 and 32 of the channels.

In both cases, the mounting of the median part of the channels providing the positioning of the joints, may be done for example by means of screws 35 traversing said median parts, and screwing into the median part of the frame. This mounting may also be done by means of screws 36 traversing said channel and screwing into nuts 37 engaged and immobilized against rotation in grooves 2.

The present invention is capable of considerable modification, and such changes thereto as come within the scope of the appended claims, is deemed to be a part thereof.

I claim:

1. A frame comprising two identical joined elements each having a section in the form of a U, each one of said elements has a median part, each leg thereof has three rectilinear parts perpendicular to said median part, and oblique parts joining said rectilinear parts, the inclination of said oblique parts being such that said legs narrow down towards their extremities, but are separated apart, the extremities of said legs have interior faces of which one of said interior faces is on a median plane perpendicular to said median part, said two identical elements having the extremity of one of the two legs of one element between those of the other element providing a final profile having two mutually perpendicular planes of symmetry, each of said planes of symmetry being parallel to two of the opposite faces of said final profile which has then, on each of two of its opposite faces, two longitudinal grooves in the form of a dovetail, one of which grooves opens on one face of the channel while the other groove opens at the bottom of the first groove.

2. A frame according to claim 1 including a strip resiliently engaged in one of said second grooves and extending beyond the bottom of the corresponding first groove to separate said first groove into two smaller grooves and moldings each extending in each of said smaller grooves to retain a pane of glass between said moldings.

3. A frame according to claim 1 including two sheets whose edges extend to the bottom of one of said first groves, and means to hold said two sheets elastically separated so that their exterior faces are applied against the projecting edges of said first groove and a second channel identical to the first channel and arranged in parallel therewith with the opposite sides of said sheets in a first groove thereof.

4. A frame according to claim 1 including sealing means comprising a strip engaged elastically in one of said second grooves and extending beyond the bottom of the corresponding first groove to separate said first groove into two smaller grooves with oblique sides, sealing joints extending beyond the face of the channel having said strip, and a trapezoidal fixing sole on each of said joints extending into one of said two smaller grooves and a similar channel arranged opposite to said first channel and constituting one of the sides of the second opening frame and similar sealing means for said similar channel.

5. A frame according to claim 1 including a section in the form of a U having unequal legs attached by its median part which median part is attached to the bottom of one of said first grooves, a sealing joint extending beyond one face of the channel, a fixing sole for said joint wedged between the shorter of said legs of said section, and one of the oblique sides of one of said first grooves and a second channel which constitutes one of the sides of an opening frame, a said second section and a second sealing joint similar to said first section and sealing joint being attached in a like manner to said second channel on a side thereof facing said first channel, said second section being arranged in such a manner that, when the opening frame is closed, each of the legs of said section attached to said opening frame will bear against the legs of the section mounted on the first channel by compressing the corresponding sealing joints.

References Cited

UNITED STATES PATENTS

| | | | |
|---|---|---|---|
| 1,097,677 | 5/1914 | Schroyer | 52—731 |
| 2,082,792 | 6/1937 | Dean | 52—729 X |
| 2,118,048 | 5/1938 | Landsem | 52—731 |
| 2,356,309 | 8/1944 | Garbe | 52—713 X |
| 3,016,993 | 1/1962 | Owen | 52—502 X |
| 3,023,859 | 3/1962 | Muessel | 49—489 X |
| 3,075,621 | 1/1963 | Attwood | 52—502 X |
| 3,093,217 | 6/1963 | Doede | 52—403 X |
| 3,147,518 | 9/1964 | Horgan | 52—397 X |
| 3,352,078 | 11/1967 | Neal | 52—731 X |
| 3,370,389 | 2/1968 | Macaluso | 52—498 X |

DAVID J. WILLIAMOWSKY, Primary Examiner

PHILIP C. KANNAN, Assistant Examiner

U.S. Cl. X.R.

52—731, 498, 403